Dec. 30, 1924.　　　　　　　　　　　　　　　1,521,170
D. BERGER
AIR BRAKE
Filed Nov. 22, 1920　　　2 Sheets-Sheet 1

Inventor
Dellno Berger

Dec. 30, 1924.

D. BERGER

AIR BRAKE

Filed Nov. 22, 1920   2 Sheets-Sheet 2

1,521,170

Inventor
Dellno Berger
his Attorneys

Patented Dec. 30, 1924.

1,521,170

UNITED STATES PATENT OFFICE.

DELLNO BERGER, OF MADISON TOWNSHIP, FRANKLIN COUNTY, OHIO.

AIR BRAKE.

Application filed November 22, 1920. Serial No. 425,845.

*To all whom it may concern:*

Be it known that I, DELLNO BERGER, a citizen of the United States, residing at Madison Township, in the county of Franklin and State of Ohio, have invented a certain new and useful Improvement in Air Brakes, of which the following is a specification.

The principal object of this invention is to procure a long and quick stroke of the actuating rod of a brake rigging with a short or inappreciable stroke of the piston thereby economizing air and taking up slack or lost motion in the rigging. Another object of the invention is to avoid leakage in the brake cylinder. Other objects will appear from the disclosure herein.

The invention is embodied in the examples herein shown and described, the features of novelty being finally claimed.

In the accompanying drawings—

Figure 1:
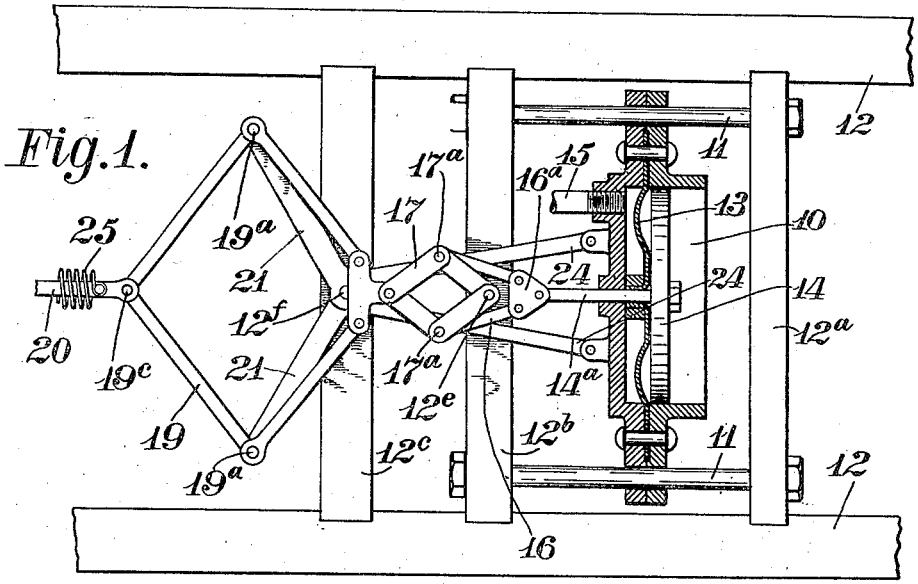
Figure 1 is a plan view of one embodiment of the invention showing the parts in the position of brakes off.
Figure 2:
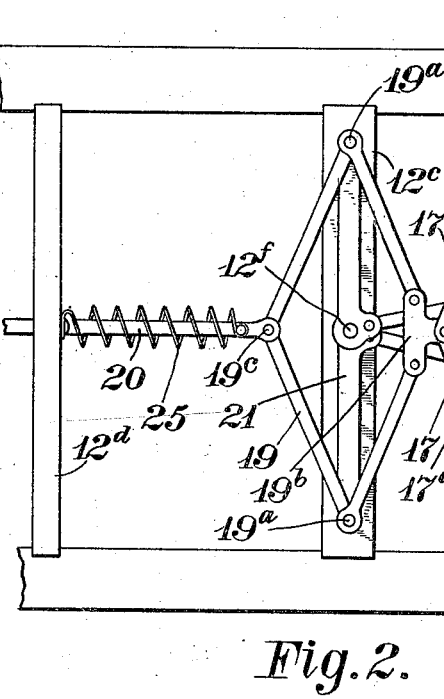
Fig. 2 is a similar view of the same showing the parts in the position of the brakes applied.

Referring first to Figs. 1 and 2 the character 10 designates the air brake cylinder, the same being mounted to slide upon parallel rods 11 of a suitable frame comprising in the instance shown side beams 12, 12, and fixed cross beams $12^a$, $12^b$, $12^c$ and $12^d$ between them. The cylinder is composed of two parts bolted together with a flexible diaphragm 13 of impervious material between them, said diaphragm serving as a packing to prevent leakage around the piston, the latter being designated 14. The diaphragm 13 is centrally perforated for the passage of the piston rod $14^a$, the diaphragm at the perforation being reinforced by a retaining ring to make and maintain a close fit on the rod. Where the piston rod passes through the cylinder head it can be provided with an ordinary stuffing box (not shown). 15 designates a pipe for the admission of pressure to the cylinder. The release of pressure from the cylinder can take place through the same pipe. Because the movement of the piston is small the diaphragm follows the piston in its stroke under pressure. The character 17 designates a double toggle member pivoted at $12^e$ upon the cross beam $12^b$. Said toggle member is actuated by the piston rod $14^a$ through two links 16 connected with the lateral hinges $17^a$ of the toggle member 17 and a connector plate $16^a$ connecting said plate with the piston rod. The points of connection of the links 16 with the plate $16^a$ are spaced so that the line of pull of the links shall not coincide with the axes of the respective adjacent arms of the toggle. The character 19 designates a larger double toggle member, the inner ends of the adjacent arms of which are connected with the smaller toggle member 17 by means of a connector plate $19^b$. The larger toggle member has hinged to the lateral pivot $19^a$ thereof a pair of bell-crank levers 21 that in turn are fulcrumed upon a common pivot pin $12^f$ on the fixed cross piece $12^c$ of the supporting frame. The other and shorter arm of the bell-crank levers 21 are connected by link rods 24 with the head of the brake cylinder. The middle hinge $19^c$ of the forward arms of the larger toggle member are connected to the rod 20 for actuating the brake rigging and brakes. The rod 20 is provided with a spring 25 tending to hold the toggle normally open or as shown in Fig. 1 with the brakes released. When air under pressure is admitted to the brake cylinder and the parts are as shown in Fig. 1 the toggles are quickly collapsed as shown in Fig. 2 drawing the rigging to braking position with only a very slight and inappreciable movement of the piston. The movement of the piston relative to the cylinder is further diminished by the fact that the cylinder itself is shoved somewhat in the same direction as the piston moves by the action of the bell-crank levers 21 on the cylinder through the link rods 24 as shown in Fig. 2. It will be noted that in this operation the cylinder is supported by the rods 24 and shoved somewhat to the right by the bell crank levers 21 in the brake applied position. The effect of this operation is to reduce the relative movement of the cylinder and piston in respect to each other and thereby reduce the required quantity of compressed air to operate the rigging. Upon the release of pressure from the brake cylinder the spring 25 retracts the rod 20 and opens the toggle as shown in Fig. 1.

Figure 3:
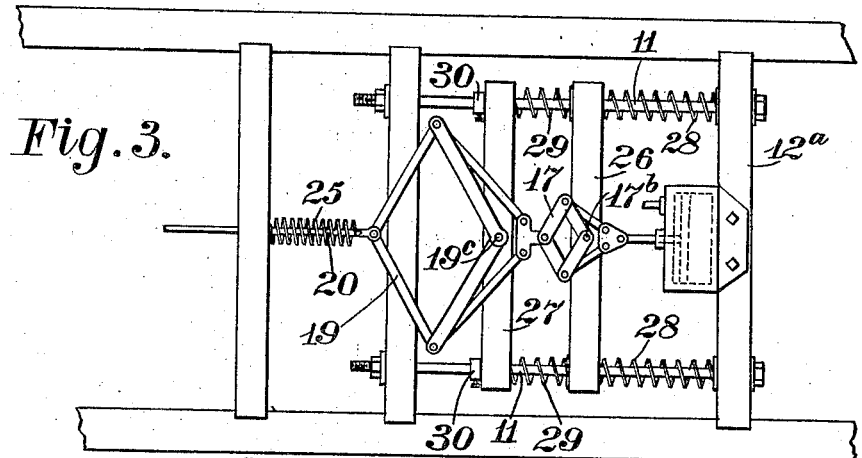
Fig. 3 illustrates in plan view a modification of the construction.

In the construction shown in Fig. 3 the hinge 17$^b$ of the small toggle device 17 is carried upon a cross-bar 26 mounted to slide upon rods 11 and the pivot pin 19$^c$ of the larger toggle is carried upon a cross-bar 27 also mounted to slide upon said parallel rods 11. Between the fixed cross bar 12$^a$ and the sliding cross-bar 26 and encircling the rods 11 are coil springs 28 tending to hold the cross bar 26 normally but yieldingly in the open position of the toggles and the released position of the brake rigging and brake; and encircling the rods 11 between slidable cross bars 26 and 27 are coil springs 29 tending to resist movement of the cross bar 26 toward the cross bar 27. The toggles are thus yieldingly supported. The rods 11 are provided with adjustable collars 30 to vary the position of the slidable cross bars 26 and 27. The coil springs 28 and 29 and the adjustable collars permit adjustment to compensate for wear on the brake shoes and wear of the peripheries of the wheels. The operation of the construction shown in Fig. 3 is similar to that of the construction shown in Figs. 1 and 2 except that the mountings of the two toggles are yielding but subject to the resistance of the springs 28 and 29, and except that bell-crank levers are not employed to actuate the cylinder, the latter being fixed in position by means of bolts 10$^a$ upon the fixed cross beam 12$^a$.

Figure 4:
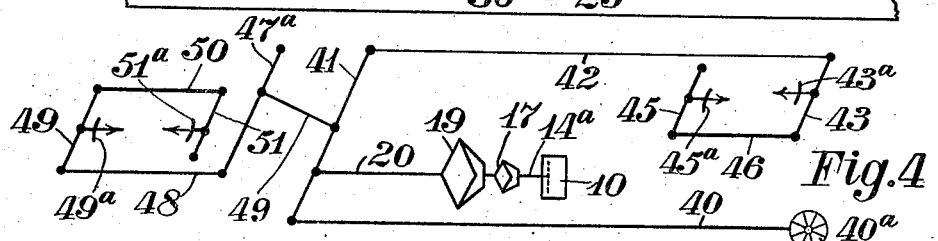
Fig. 4 is a diagram illustrating the application of my invention to a brake rigging of a car.

Fig. 4 illustrates diagrammatically how the invention can be applied to a brake rigging. In this view the main or primary brake rod 40 is connected by a cross lever 41 with another longitudinal rod 42 that has connected with it lever 43 and lever 45, the two last being connected by a rod 46 and carrying brake shoes 43$^a$ and 45$^a$ to bear upon the car wheels at one end of the car. The cross lever 41 is connected by rod 47 with another cross lever 47$^a$ and to this is connected a rod 48, lever 49, rod 50 and lever 51. The levers 49 and 51 carry the brake shoes 49$^a$ and 51$^a$ to bear upon the car wheels at the other end of the car. My actuating mechanism is shown as connected with the cross lever 41, the brake cylinder being indicated at 10, its piston rod at 14$^a$, the toggles at 17 and 19 respectively and the brake rigging actuating rod at 20. The character 40$^a$ designates the usual hand wheel for operating the rigging if necessary.

Figure 5:
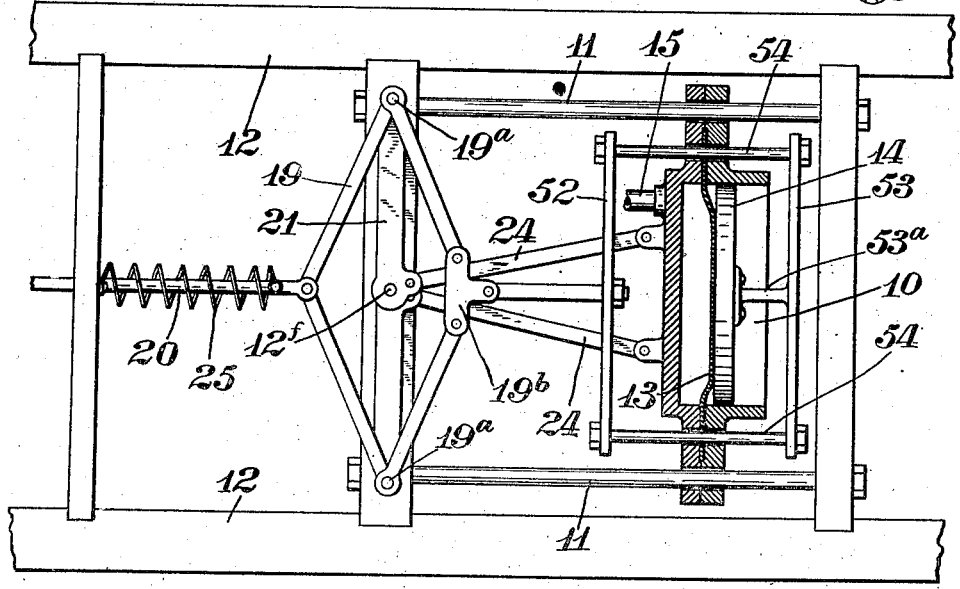
Fig. 5 illustrates means for connecting the motion transforming mechanism with a piston so as to avoid perforating the cylinder head for the piston rod and the consequent necessity for providing a stuffing box.

Fig. 5 illustrates how the perforation of the cylinder head for the passage of the piston rod is avoided. In this construction the connector piece 19$^b$ of the toggle member 19 is connected with the rear side of the piston by means of a yoke frame comprising cross members 52 and 53 and connecting bars 54 that straddle the cylinder. The rear cross member 53 is provided with a central offset 53$^a$ to which the piston is secured by screws. In this construction the leakage of pressure from the brake cylinder by way of a stuffing box is entirely avoided and the brakes more securely held when the brakes are set. This construction also avoids difficulties in releasing brakes because when there has been a partial leak the response of the mechanism to a brake application by the engineer is not as prompt and effective as where there has been no leakage.

Among the important advantages of my invention is that an extensive and quick movement of the brake rigging is obtained with an inappreciable movement of the brake cylinder piston. Another important advantage is that the pull on the brake rigging actuating rod is centralized and the motion transmission mechanism compacted to small space.

What I claim is:

1. In an air brake mechanism, the combination with a fixed frame and a brake rigging, of a brake cylinder sliding on said frame, a piston sliding in said cylinder, a toggle member pivoted on the fixed frame and connected with and operated by the piston and means actuated by the toggle to move the cylinder in a direction coinciding with the movement of the piston.

2. In an air brake mechanism, the combination with a fixed frame and a brake rigging, of a brake cylinder sliding on said frame, a piston sliding in said cylinder, a toggle member connected with said piston, a bell crank lever pivoted on said frame and supporting said toggle member on one of its arms and a link connecting the other arm of said bell crank lever with the cylinder whereby the cylinder is caused to move in a direction coinciding with the direction of movement of the piston.

3. In an air brake mechanism, the combination with a fixed frame and a brake rigging, of a brake cylinder having an open end sliding on said frame, a piston sliding in said cylinder, a frame connected with the exposed side of said piston and sliding therewith, a toggle pivoted on the fixed frame connected with the brake rigging and the piston frame and means operated by said toggle for moving the cylinder in a direction coinciding with the movement of the piston.

DELLNO BERGER.